United States Patent [19]

Bains

[11] 4,266,386
[45] May 12, 1981

[54] PANEL JOINT FOR ASSEMBLING PANEL MEMBERS

[75] Inventor: Gurdip S. Bains, Bonneauville, Pa.

[73] Assignee: Westinghouse Electric Corp., Pittsburgh, Pa.

[21] Appl. No.: 80,973

[22] Filed: Oct. 2, 1979

[51] Int. Cl.³ .................................................. E04C 1/10
[52] U.S. Cl. ...................................... 52/584; 52/589
[58] Field of Search .............. 52/584, 589, 586, 580, 52/284, 582, 127; 403/335, 338

[56] References Cited

U.S. PATENT DOCUMENTS

| | | | |
|---|---|---|---|
| 3,143,195 | 8/1964 | Schroeder, Jr. | 52/284 X |
| 3,332,182 | 7/1967 | Mark | 52/584 X |
| 3,439,465 | 4/1969 | Du Pre | 52/584 |
| 3,683,576 | 8/1972 | Sikes | 52/580 X |
| 3,731,956 | 5/1973 | Hanley | 52/582 |
| 3,894,377 | 7/1975 | Welch | 52/584 |
| 4,199,907 | 4/1980 | Bains et al. | 52/584 X |

*Primary Examiner*—Carl D. Friedman
*Attorney, Agent, or Firm*—D. R. Lackey

[57] ABSTRACT

A panel joint, including first and second upstanding metallic panel members, spacer members on the first panel member, a vertically slidable locking member on the second panel member, and cooperative slots in the second panel member and locking member which receive the spacer members in first positions of the locking member and first panel member, secure the panel members in assembled relation in a second position of the first panel member, and lock the panels tightly together in a second position of the locking member.

7 Claims, 8 Drawing Figures

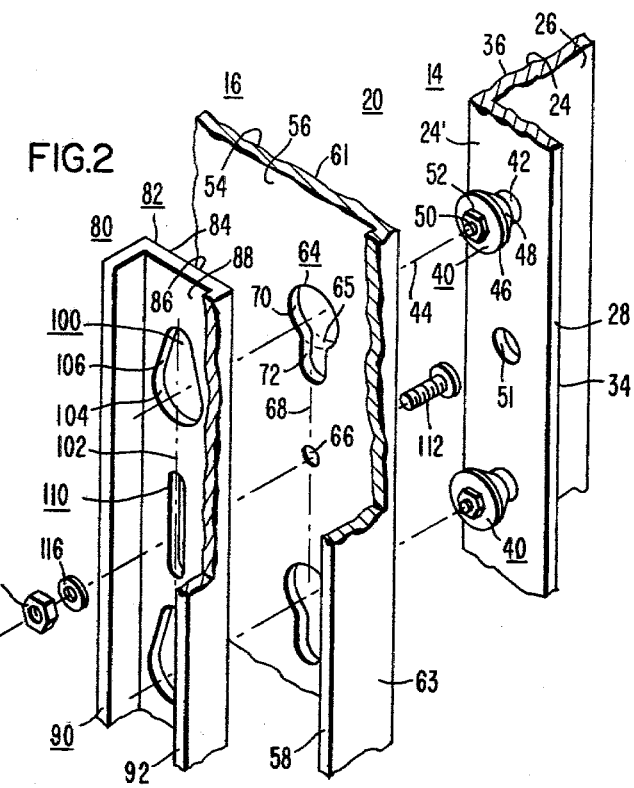
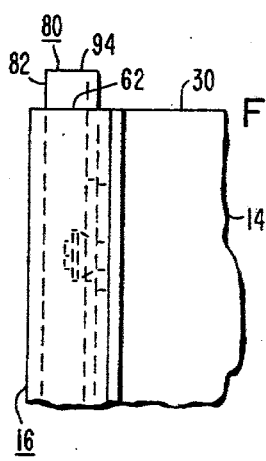
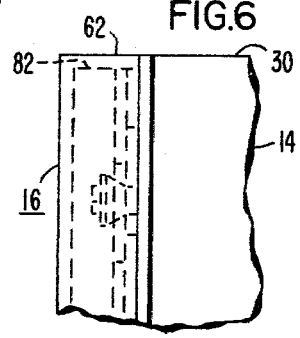
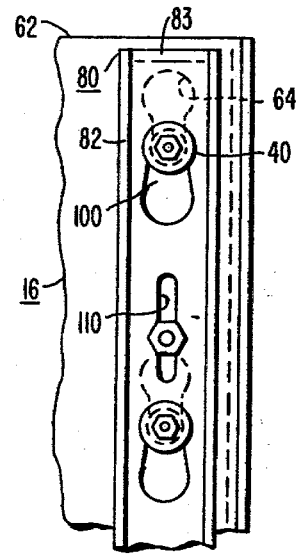
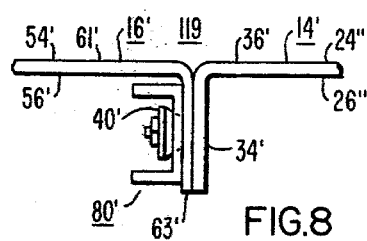

PANEL JOINT FOR ASSEMBLING PANEL MEMBERS

BACKGROUND OF THE INVENTION

1. Field of the Invention

The invention relates in general to panel joints, and more specifically to panel joints for joining two upstanding metallic panel members in a confined location.

2. Description of the Prior Art

Metallic panel members are often required to be joined together to form a room or cubicle, and it is essential that the joining hardware be concealed. Thus, the joining hardware must be applied to the back sides of the panels, i.e., those surfaces outside the cubicle. Further, these applications require the room or cubicle to be assembled within a space which denies access to the back sides of the panels, once they are placed in an upstanding adjacent position preparatory to the joining step. An example of such an application is the assembly of a metallic elevator cab on a platform in the hatch or hoistway of a building. The panels which form the cab are located about one inch from the sides of the platform, and the platform is so close to the walls of the hoistway that an assembler would find it difficult or impossible to work between the panels and the hoistway walls. Typical spacings between the platform and hoistway walls are two inches between the platform and the front and back walls, and eight inches between the platform and the side walls.

Present hardware for joining metallic panel members requires that the back panel be placed on the platform in the hatch, and the panel first placed at a skewed angle relative to the rear edge of the platform. This enables the assembler to gain access to the hardware for joining a first side panel to the back panel. The assembled back and first side panels are then rotated about 90° about a vertical axis, placing the back panel at a second skewed angle relative to the back edge of the platform, enabling the second side panel to be joined to the back panel. The resulting assembly is then oriented properly relative to the platform, with the entire assembly operation requiring several hours of tedious maneuvering of panels and hardware in a very confining location.

It would thus be desirable to provide a new and improved panel joint, and method of assembling same, for relatively large, heavy metallic panel members which enables the panel members to be quickly and tightly joined with a joint which is uniform and tight along its complete length. Further, the joint must be such that it will stay tight during usage, even when subjected to movement, such as in the hereinbefore mentioned elevator cab application.

Still further, the panel joint, and method, must permit assembly in locations which have very little space adjacent to the back sides of the panels, with the panel members being quickly joined without requiring skewing and turning of the panels, and without requiring access to the back sides of the panels.

SUMMARY OF THE INVENTION

Briefly, the present invention is a new and improved panel joint, and a method for assembling first and second upstanding metallic panel members, which joint and method do not require access to the rear sides of the panels during assembly. In a first embodiment of the invention wherein the panel members are joined in a right angle configuration, the first panel member is bent near one edge to provide a narrow, vertically extending surface for receiving a plurality of spacer members having head and shank portions, and a tapered portion therebetween. A vertically slidable locking member is attached to the second panel, on the side which is on the obtuse side of the right angle configuration. An elongated slot in the locking member and an opening in the second panel member cooperatively define an opening for receiving the spacer members, when the locking member is operated upwardly such that its upper end extends above the upper edge of the second panel member. In one embodiment of the invention, the cooperatively defined opening is formed by two elongated slots, with the locations of these openings, and the locations of the spacer members on the first panel member, being located relative to one another such that the first panel member must be elevated slightly in order to align the spacers with the openings. Advancing the elevated first panel member towards the second panel member causes the spacers to enter the cooperatively formed openings, and lowering of the first panel member results in automatically capturing the spacer members in the slots of the second panel member, insuring that the panel members cannot accidentally become disassembled. In another embodiment, the cooperatively defined opening is formed by an elongated slot and round opening, and the need for elevating the first panel member as it is assembled is eliminated. In either embodiment, after the first and second panel members are assembled, the locking member is then forced vertically downward, by an assembler located on the acute side of the right angle configuration, locking the first and second panel members tightly together through cooperative action between the slots in the locking member and the tapered portion of the spacer members. Still another embodiment of the invention applies the principles of the panel joint for the right angle configuration, to an in-line panel joint.

BRIEF DESCRIPTION OF THE DRAWINGS

The invention may be better understood, and further advantages and uses thereof more readily apparent, when considered in view of the following detailed description of exemplary embodiments, taken with the accompanying drawings in which:

FIG. 2 is an enlarged, fragmentary, exploded, perspective view of the panel joint hardware and panel members of FIG. 1, which more clearly illustrates the details of the panel joint hardware;

FIG. 5 is a view similar to that of FIG. 3, except illustrating the panel joint after additional steps of the joining method;

FIG. 6 is a view similar to FIG. 5, except illustrating the panel joint following the last step of the joining method;

FIG. 7 is a view similar to that of FIG. 4, except illustrating the panel joint following the last step of the joining method; and FIG. 8 is a fragmentary plan view of an in-line panel joint constructed according to the teachings of the invention.

DESCRIPTION OF PREFERRED EMBODIMENTS

The invention is a new and improved panel joint, and method for joining relatively large and heavy metallic panel members, with the invention being applicable to both right angle panel joints, and in-line panel joints. The invention facilitates the assembly of metallic panel members on a platform disposed in a hatch to form the cab of an elevator car, and the invention will be described in this context.

Figure 1:
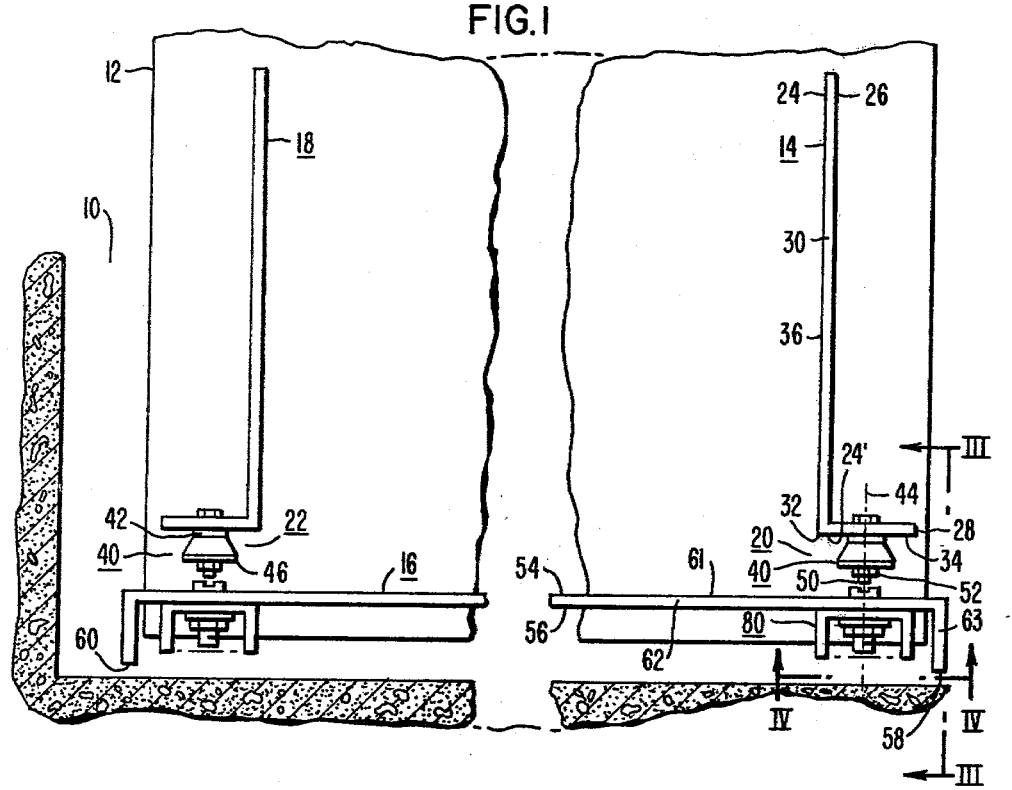
FIG. 1 is a fragmentary plan view of new and improved panel joint hardware fixed to first and second metallic panel members to be joined, disposed in a first pre-assembly step.

FIG. 1 is a fragmentary, plan view of an elevator hatch or hoistway 10, an elevator platform 12 disposed in the hatch 10, and pre-assembly stages in the formation of new and improved panel joints according to new and improved methods of assembling panel members. The panel joints are illustrated as being formed between a first metallic panel member 14 and a second metallic panel member 16, and between a third metallic panel member 18 and the second metallic panel member 16, forming panel joints 20 and 22, respectively, which joints join panel members in right angle configurations. Since panel joints 20 and 22 are similar, only panel joint 20 will be described in detail. In addition to FIG. 1, FIG. 2 will also be referred to in describing panel joint 20, with FIG. 2 being an exploded, fragmentary perspective view of panel joint 20.

The first metallic panel member 14, which forms an upstanding first side member of the elevator cab, is formed of a suitable metal, such as steel, having a predetermined thickness dimension, such as 0.075 inch. Panel member 14 has first and second major opposed surfaces 24 and 26, respectively, which form front or inside and rear or outside surfaces, respectively, of the elevator cab. Panel member 14 further includes vertically extending side edges, such as side edge 28, and horizontally extending upper and lower edges, such as upper or top edge 30.

Panel member 14 is bent into a right angle configuration with a vertically extending bend 32, which is located closely adjacent to and parallel with the side edge 28. Bend 32 provides a minor leg 34, and a major leg 36, with the direction of bend 32 being such that the first or front surface 24 is located on the obtuse side of the resulting right angle configuration.

Bend 32 creates a surface 24' perpendicular to the major front surface 24 of panel member 14. A plurality of spacer members 40, which form a first portion of the joint hardware for panel joint 20, are mounted on the minor leg 34, on surface 24'. Bend 32 also serves to stiffen panel member 14, and a similar bend may be disposed adjacent to the remaining side edge, if desired, for further stiffening the panel member.

Each of the spacer members 40 is a metallic member, formed of a suitable material such as steel, including a smooth, round shank portion 42 having a predetermined diameter, such as about 0.5 inch. The shank portion 42 has a length dimension in the direction of a longitudinal axis 44, which is substantially the same as the thickness dimension of panel member 16, such as 0.075 inch.

Spacer member 40 further includes a smooth, round head portion 46 having a predetermined diameter, such as about 0.075 inch. Instead of shank 42 and head 46 joining at right angles relative to one another, it is important to note that an angled or tapered cam surface 48 is provided between shank 42 and head 46. Surface 48 intersects shank portion 42 with a predetermined angle, such as an angle of about 25°.

Spacer member 40 is secured to surface 24' of panel member 14 via suitable fastener means. For example, suitable openings may be provided through panel member 14, and each of the spacer members 40 may have an opening coaxial with its longitudinal axis. A bolt 50 may be inserted through each opening in panel member 14, and through the opening in spacer member 40, and a nut 52 is assembled on the bolt, to complete the assembly. Alternatively, bolts 50 may be replaced by studs which are welded to surface 24'.

A plurality of spacer members 40 are attached to surface 24' of panel member 14, with the centers of the spacer members 40 being vertically spaced on a common vertical imaginary line spaced from and parallel with the side edge 28 of the panel member 14.

The second metallic member 16, which is joined to the first metallic member 14 via panel joint 20, is similar to panel member 14 in that it is formed of a suitable metal, such as steel, having a predetermined thickness dimension such as 0.075 inch. Panel member 16 has first and second major opposed surfaces 54 and 56, which form front or inside and rear or outside surfaces, respectively, of the elevator cab. Panel member 16 further includes vertically extending side edges 58 and 60, and horizontally extending upper and lower edges, such as upper or top edge 62.

Panel member 16 may be bent into right angle configurations adjacent to side edges 58 and 60, if desired, forming major and minor leg portions 61 and 63, respectively, adjacent to edge 58 in order to stiffen the panel. Panel member 16 further includes a plurality of vertically spaced, openings 64, which may be elongated slots as shown in solid, or round openings, as shown in phantom. If openings 64 are slots, panel member 14 is lifted in order to align spacer members 40 with a spacer head receiving portion of the slots, as will be hereinafter explained. If openings 64 are round, they are aligned with spacer members 40, without requiring panel member 14 to be lifted. Panel member 16 additionally includes a plurality of round openings 66. When openings 64 are in the form of elongated slots, they have their longitudinal axes aligned with a vertical axis 68, and the centers of openings 66 are also disposed on vertical axis 68. Each of the slots 64 includes an enlarged portion 70 at its upper end, which communicates with a narrower portion 72, with the narrower portion extending to its lower end. Enlarged portion 70 is sized to accept the diameter of head 46 of spacer member 40. The sides of the narrower portion 72 may be parallel with one another, as clearly shown in FIG. 2, and spaced apart by a dimension selected to receive the diameter of shank portion 42 of the spacer member 40. When openings 64 are round, as shown by the phantom lines 65, they are sized the same as the enlarged portion 70 of the elongated slot, but they are located such that they are aligned with spacer members 40 when panels 14 and 16 are at the same elevation.

As hereinbefore stated, spacer members 40 constitute a first portion of the joint hardware for panel joint 20, with spacer members 40 being fixed to the first panel member 14. A second portion of the joint hardware for joint 20 is provided by locking means 80 which is slidably fastened to the second or rear major surface 56 of the second panel member 16. Locking means 80 includes an elongated channel member 82 formed of metal, such as steel, having a predetermined thickness dimension such as 0.090 inch. The channel shaped cross-sectional configuration of the channel member 82 provides the required stiffness.

Figure 4:
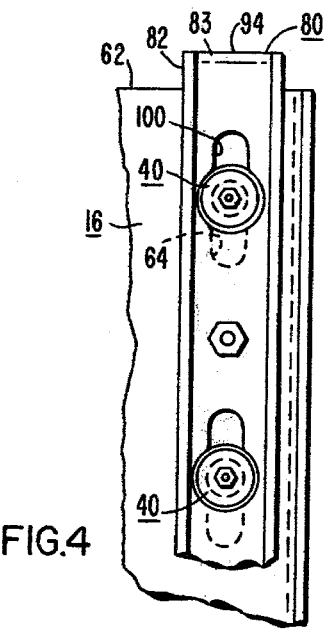
FIG. 4 is a fragmentary view, in elevation, of the pre-assembly step shown in FIG. 1, taken between and in the direction of arrows IV—IV in FIG. 1.

Channel member 82 includes a back or bight portion 84 having first and second major opposed surfaces 86 and 88. Channel member 82 additionally includes side or leg portions 90 and 92 which project from a common side of bight 84, such as side 88, and upper and lower ends, such as upper end 94. As shown in FIGS. 4 and 7, a block 83 of metal may be welded between the leg portions 90 and 92 at the upper end 94.

A plurality of spaced, elongated slots or openings 100 are provided in bight 84, with the longitudinal axes of slots 100 being aligned with an axis 102 which extends between the upper and lower ends of channel member 82. Each of the slots 100 includes an enlarged portion 104 on the end of the slot which faces the lower end of the channel member 82, which enlarged portion is sized to accept the diameter of head portion 46 of a spacer member 40. Each of the slots 100 further includes a narrow portion 106 which tapers inwardly from the enlarged portion 104 such that the sides of the narrow portion 106 converge as the slot nears its upper end. The upper end of slot 100 is terminated by a half-circle, with the diameter of the half cycle being slightly less than the diameter of shank 42 of spacer member 40. For example, if shank 42 has an O.D. of 0.5 inch, the diameter of the half-circle at the upper end of slot 100 may be about 0.44 inch. Slots 100 are aligned with, and they cooperate with openings 64 in panel member 16, as will be hereinafter explained.

In addition to the elongated tapered slots 100, a plurality of elongated straight slots 110 are provided in bight 84, with the longitudinal axes of slots 110 also lying on axis 102. Slots 110 cooperate with openings 66 in the second panel member 16, and suitable fastening means, such as a screw or bolt 112, nut 114, and washer 116, slidably fasten locking means 80 to the rear surface 56 of the second panel member 16. Bolt 112 is disposed through opening 66 and slot 110, and the nut is then tightened on washer 116 to the point where the locking means 80 may be vertically positioned where desired under the influence of a predetermined vertical force, up or down, and it will then maintain this position without sliding to the bottom of its travel path.

Alternatively, instead of providing openings 66 through panel member 16, and bolts 112, suitable studs may be welded to surface 56 of panel member 16, for the purpose of securing the channel member 82 of locking means 80 in the hereinbefore mentioned sliding relationship with the rear surface 56 of panel member 16. If bolts 112 are used, a suitable opening 51 is provided in the minor leg 34 of panel member 14, to permit surface 24' to butt tightly against surface 54 of the second panel member 16.

Locking means 80 is dimensioned such that slidably operating it to the uppermost position of its travel path causes the enlarged portion 104 of slot 100 to be aligned with opening 64. If opening 64 is a slot, it is aligned with the enlarged portion 70 of the slot.

When openings 64 are elongated slots, spacer members 40 are located on the first panel member 14 such that panel member 14 must be raised slightly in order to orient their centerlines or axes 44 with the centers of the cooperatively formed openings defined by the aligned, enlarged portions of slot 100 and opening 64 when the locking means is actuated to its uppermost position. When openings 64 are round, the spacer members 40 are located such that when panel members 14 and 16 are upstanding on a common plane surface, they will each be aligned with an opening 64.

Figure 3:
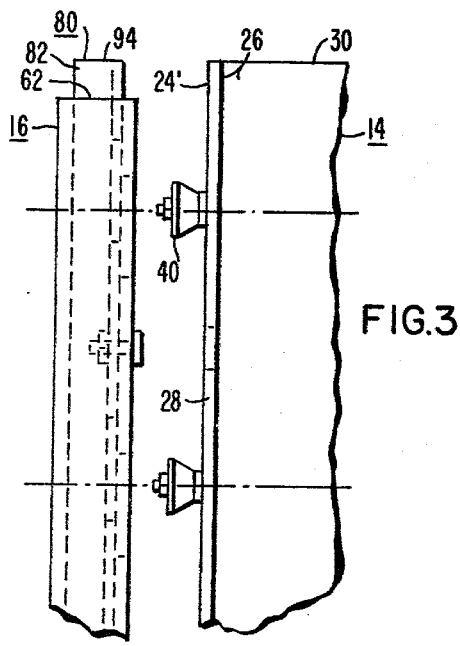
FIG. 3 is a fragmentary view, in elevation, of the pre-assembly step shown in FIG. 1, taken between and in the direction of arrows III—III in FIG. 1.

The method of assembling panel joint 20 will now be explained, with FIGS. 1 and 3-7 illustrating various steps of the method. As illustrated in FIGS. 1, 3 and 4, which are plan, side and rear elevational views, respectively, of a first assembly step, the second or rear panel member 16 is placed in its required position on platform 12 adjacent to the back portion of hatch 10, with the locking means 80 operated to its uppermost position. The first or side panel member 14 is placed close to its final desired assembled position, and in the embodiment in which openings 64 are in the form of slots it is lifted slightly to align the axes 44 of spacer members 40 with the aligned, enlarged portions of slots 100 and 64. Panel member 14 is then horizontally advanced towards panel member 16 to cause spacer members 40 to enter the cooperatively defined openings, and, as illustrated in FIG. 5, panel member 14 is then lowered to floor level, which results in panel members 14 and 16 being immediately and automatically held in assembled relation. This is due to the shank portions 42 of spacer members 40 entering the narrow portions 72 of slots 64 in panel member 16. In the embodiment in which openings 64 are round, panel member 14 is simply horizontally advanced towards panel member 16 to cause spacer members 40 to enter the openings 64 and slots 100.

As shown in FIG. 5, the action of lowering panel member 14, in the embodiment which requires that it be lifted, also lowers the top end of channel member 82 of locking member 80, but it may be dimensioned such that its upper end 94 will still be located above the now aligned upper edges 30 and 62 of panel members 14 and 16, respectively. At this point of the assembly, the head portions 46 of spacer members 40 are still within the enlarged portions 104 of slots 100.

The next step, shown in FIGS. 6 and 7, in either of the specified configurations of opening 64, is to force the locking channel member 82 downwardly, such as by applying a sharp blow to the upper end 94 of channel member 82 with a hammer. This action causes the tapered sides 106 of slots 100 to be cammed down the tapered transition 48 of spacer members 40, forcing panel members 14 and 16 tightly together and securely locking the resulting panel joint. This joint is initially tight, and it remains tight during usage, notwithstanding movement and vibration, such as might be experienced in the elevator cab application hereinbefore described.

While the invention is particularly useful for joining panel members in a right angle configuration, it applies equally to joining in-line panels, such as when the rear wall of the elevator cab is wide enough to require the use of two in-line panel members, or when the corners of the cubicle being formed are right angle members, requiring in-line side panels to be attached to its two leg portions. FIG. 8 is a fragmentary plan view which illustrates an in-line joint 119 constructed according to the teachings of the invention. Components in FIG. 8 which correspond to those in the right angle panel joint 20 of FIGS. 1-7 are given like reference numerals, with the addition of a prime mark, in order to distinguish them from the elements of joint 20. In this embodiment, the openings 64 and 66 are formed in minor leg portion 63 of panel member 16, instead of major leg portion 61. Otherwise, the two joints are the same.

In any of the embodiments, a locking arrangement may be used to ensure that the joint will not loosen. For example, a threaded stud may be secured to panel member 14, above the uppermost spacer member 40, and a cooperative slot may be formed in the bight 88 of the locking channel 82. A lock washer and nut may then be used to secure the assembly.

In summary, there has been disclosed a new and improved panel joint, and method of constructing same, which enables metallic panel members to be quickly joined and locked while requiring access to only one side of the joint. For example, when the panels are joined in a right angle configuration, the panels may be installed by an assembler on the acute side of the right angle configuration.

I claim as my invention:

1. A panel joint, comprising:

first and second upstanding metallic panel members each having upper and lower edges, and first and second major opposed surfaces, a plurality of spacer members having head and shank portions, with their shank portions being fixed to only said first panel member, in predetermined vertically spaced relation with one another on a selected portion of the first major surface thereof, an elongated locking member slidably attached to the second major surface of said second panel member, said locking member having a plurality of vertically spaced, vertically oriented elongated slots therein, having upper and lower ends, with its lower end having an enlarged spacer head receiving portion, and with a narrower, spacer shank receiving portion extending upwardly therefrom towards its upper end, said second panel member having a plurality of vertically spaced, openings therein, said slots and openings of said locking member and said second panel member, respectively, being disposed to define a plurality of cooperative pairs, with portions of the slot and opening of each pair being aligned as the locking member is operated between predetermined upper and lower travel limits, said second panel member being disposed such that a selected portion of its first major surface butts against the selected portion of the first major surface of the first panel member on which said spacer members are fixed, with each of said spacer members extending through an opening defined by a cooperative pair, said first and second panel members having said selected portions of their first major surfaces forced tightly together when the locking member has been forced towards its lower travel limit to provide a joint between said first and second panel members in which said locking member is visible from only one side thereof; regardless of the relative orientation between said first and second panel members.

2. The panel joint of claim 1 wherein the first and second panel members each have a vertically extending bend line which forms a right angle configuration defining a minor leg portion and a major leg portion, with the spacer members being fixed to the minor leg portion of the first panel member and with the openings being formed in the major leg portion of the second panel member such that the first and second panel members define a right angle configuration when assembled.

3. The panel joint of claim 1 wherein the first and second panel members have vertically extending side edges, with the first panel member having a bend line closely spaced to but parallel with a selected side edge such that the first major surface is on the outside of a right angle configuration, with the spacer members being fixed to the first surface between the bend line and selected edge, and wherein the first surface between the bend line and the selected edge is butted against the first surface of the second panel member.

4. The panel joint of claim 1 wherein the locking member and the first and second panel members have predetermined thickness dimensions, and wherein each of the plurality of spacer members includes a tapered cam surface which tapers inwardly from its head to its shank portion, with the length of the shank portion being dimensioned to be substantially equal to the thickness of the second panel member.

5. The panel joint of claim 4 wherein the spacer shank receiving portion of each of the slots in the locking member is tapered to cooperate with the tapered cam surface of the spacer members, such that downward movement of the locking member cams the locking member against the second major surface of the second panel member and forces the first major surface of the first panel member against the first major surface of the second panel member.

6. The panel joint of claim 5 wherein the openings in the second panel member are in the form of vertically oriented, elongated second slots having upper and lower ends, with the upper end of each of said second slots having an enlarged spacer head receiving portion, and with a narrower spacer shank receiving portion extending downwardly therefrom towards its lower end, with the spacer shank receiving portion of each of said second slots having substantially parallel side surfaces spaced to receive the shank portion of a spacer member without interference, with the relationship between the locations of said second slots and the spacer members being such that the upper edge of the first panel member must be lifted higher than the upper edge of the second panel member to orient the spacers with, and cause the heads of the spacers to enter, the spacer head receiving portions of the second slots, with the shank portions of the spacers entering the shank receiving portion of the second slots when the upper edge of the first panel member is lowered flush with the upper edge of the second panel member.

7. The panel joint of claim 1 wherein the first and second panel members each have a vertically extending bend line therein which forms a right angle configuration having a minor leg portion and a major leg portion, with the spacer members being fixed to the minor leg portion of the first panel member and with the openings being formed in the minor leg portion of the second panel member such that the first and second panel members define an in-line configuration when assembled.

* * * * *